(12) United States Patent
Yaguchi et al.

(10) Patent No.: US 9,067,584 B2
(45) Date of Patent: Jun. 30, 2015

(54) VEHICLE AND CONTROL METHOD FOR VEHICLE

(75) Inventors: Hideaki Yaguchi, Toyota (JP); Takeshi Hoshiba, Anjo (JP); Akihiro Kimura, Toyota (JP); Masahiro Naito, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/976,592

(22) PCT Filed: Jan. 27, 2011

(86) PCT No.: PCT/JP2011/051559
§ 371 (c)(1),
(2), (4) Date: Jun. 27, 2013

(87) PCT Pub. No.: WO2012/101798
PCT Pub. Date: Aug. 2, 2012

(65) Prior Publication Data
US 2013/0297130 A1  Nov. 7, 2013

(51) Int. Cl.
*B60W 20/00* (2006.01)
*B60K 6/445* (2007.10)
*B60W 10/06* (2006.01)
*B60W 10/08* (2006.01)
*B60W 10/02* (2006.01)
*B60W 50/08* (2012.01)
*B60K 6/38* (2007.10)

(52) U.S. Cl.
CPC .............. *B60W 20/00* (2013.01); *B60K 6/445* (2013.01); *B60W 20/40* (2013.01); *B60W 50/082* (2013.01); *B60W 2540/06* (2013.01); *B60W 10/06* (2013.01); *B60W 10/08* (2013.01); *Y10S 903/93* (2013.01); *Y02T 10/6239* (2013.01); *B60W 10/02* (2013.01); *B60K 2006/381* (2013.01)

(58) Field of Classification Search
USPC .......................................................... 701/22
See application file for complete search history.

(56) References Cited

U.S. PATENT DOCUMENTS

| 6,488,107 B1 | 12/2002 | Ochiai et al. |
| 6,961,646 B2* | 11/2005 | Soliman et al. ................. 701/51 |
| 7,219,757 B2* | 5/2007 | Tomita et al. ............ 180/65.275 |
| 7,238,133 B2* | 7/2007 | Tabata et al. ...................... 475/5 |
| 7,722,498 B2* | 5/2010 | Kawasaki et al. ................. 477/3 |

(Continued)

FOREIGN PATENT DOCUMENTS

| CN | 101386302 A | 3/2009 |
| JP | 2001-065385 A | 3/2001 |

(Continued)

OTHER PUBLICATIONS

U.S. Appl. No. 13/978,762, filed Jul. 9, 2013 in the name of Yaguchi et al.

(Continued)

*Primary Examiner* — Thomas Tarcza
*Assistant Examiner* — Alex C Dunn
(74) *Attorney, Agent, or Firm* — Oliff PLC

(57) ABSTRACT

A vehicle is provided with a differential gear including a sun gear, a carrier, and a ring gear, motor generators coupled to the sun gear, an engine coupled to the carrier, and a wheel coupled to the ring gear. The vehicle includes an ECU that stops the engine upon operation of a start switch by a driver, and a brake that brakes the sun gear upon operation of the start switch while the vehicle is traveling.

6 Claims, 4 Drawing Sheets

(56) References Cited

U.S. PATENT DOCUMENTS

| | | | |
|---|---|---|---|
| 7,950,485 B2* | 5/2011 | Fukumura | 180/65.7 |
| 2002/0115516 A1* | 8/2002 | Kawabata et al. | 475/5 |
| 2005/0209044 A1* | 9/2005 | Imazu et al. | 477/15 |
| 2007/0275819 A1* | 11/2007 | Hirata | 477/5 |
| 2008/0098246 A1 | 4/2008 | Kim | |
| 2009/0076693 A1 | 3/2009 | Kumazaki et al. | |
| 2009/0101428 A1* | 4/2009 | Itoh | 180/197 |
| 2009/0143950 A1* | 6/2009 | Hasegawa et al. | 701/68 |
| 2009/0236159 A1* | 9/2009 | Shibata et al. | 180/65.235 |
| 2009/0299559 A1 | 12/2009 | Shimohira et al. | |
| 2010/0030412 A1* | 2/2010 | Mitsutani | 701/22 |
| 2010/0160111 A1* | 6/2010 | Yamanaka et al. | 477/45 |
| 2010/0244886 A1 | 9/2010 | Kawahara et al. | |
| 2011/0314316 A1 | 12/2011 | Kim | |
| 2012/0162693 A1 | 6/2012 | Ito | |
| 2012/0203414 A1* | 8/2012 | Akutsu et al. | 701/22 |
| 2013/0253749 A1 | 9/2013 | Hayashi et al. | |
| 2013/0261866 A1 | 10/2013 | Hoshiba | |

FOREIGN PATENT DOCUMENTS

| | | |
|---|---|---|
| JP | 2005-261041 A | 9/2005 |
| JP | A-2007-023919 | 2/2007 |
| JP | A-2007-216833 | 8/2007 |
| JP | 2008-190495 A | 8/2008 |
| JP | A-2009-67257 | 4/2009 |
| JP | 2009-149116 A | 7/2009 |
| JP | 2009-280176 A | 12/2009 |

OTHER PUBLICATIONS

U.S. Appl. No. 13/978,975, filed Jul. 10, 2013 in the name of Yaguchi et al.

* cited by examiner

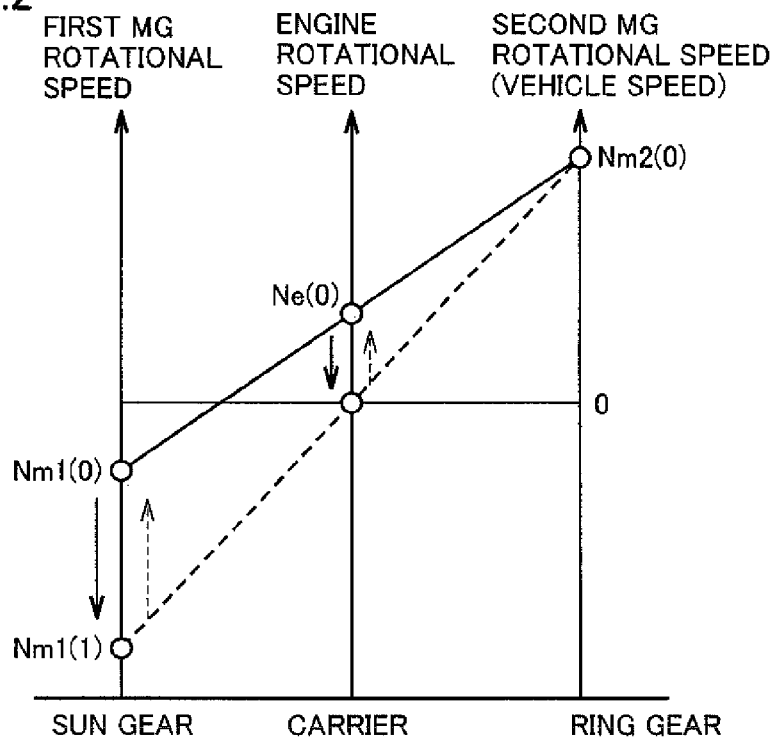
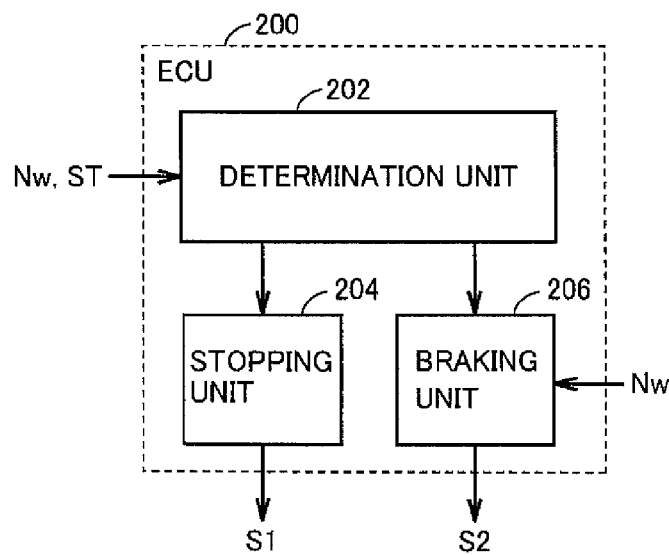

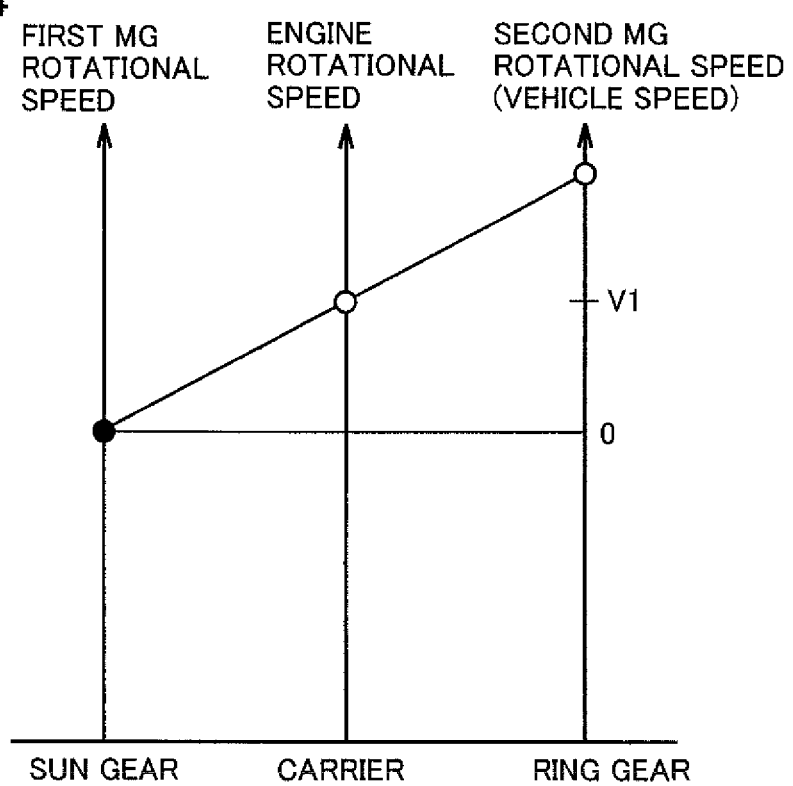

VEHICLE AND CONTROL METHOD FOR VEHICLE

TECHNICAL FIELD

The present invention relates to a vehicle and a control method for a vehicle, and in particular to a technique for restricting the rotational speed of an output shaft of an electric motor when an engine is stopped during traveling.

BACKGROUND ART

Japanese Patent Laying-Open No. 2007-23919 (PTL1) discloses an engine start control system disclosing a technique of restarting an engine when a push switch is pushed even if a brake pedal is not depressed, if the engine is stopped due to some cause while a vehicle is traveling.

In addition, in recent years, as one of the countermeasures against environmental problems, hybrid vehicles each equipped with an electric motor (motor generator) and an engine have received attention. A publicly known example of such a hybrid vehicle is a vehicle with elements: drive wheels, an engine, and an electric motor which are mechanically coupled together.

CITATION LIST

Patent Literature

PTL 1: Japanese Patent Laying-Open No. 2007-23919

SUMMARY OF INVENTION

Technical Problem

In the hybrid vehicle as described above, since the elements are mechanically coupled together, the output shaft of the electric motor may be in negative rotation even if the engine is stopped. In such a case, driving the electric motor to crank the engine can cause the electric motor to generate electric power while the electric motor is negatively rotating. As the rotational speed of the output shaft of the electric motor becomes higher, the generated electric power increases. Such generation of electric power is unintentional. Therefore, electric power may be generated more than required.

An object of the present invention is to restrict the rotational speed of the output shaft of the electric motor when the engine is stopped during traveling.

Solution to Problem

A vehicle includes a control unit that stops an engine upon operation of a switch by a driver, and a braking device that brakes a first rotation element upon operation of the switch while the vehicle is traveling. The vehicle is provided with a differential gear including the first rotation element, a second rotation element, and a third rotation element, an electric motor coupled to the first rotation element, the engine coupled to the second rotation element, and a wheel coupled to the third rotation element.

In another embodiment, a control method for a vehicle includes the steps of stopping an engine upon operation of a switch by a driver, and braking a first rotation element upon operation of the switch while the vehicle is traveling. The vehicle is provided with a differential gear including the first rotation element, a second rotation element, and a third rotation element, an electric motor coupled to the first rotation element, the engine coupled to the second rotation element, and a wheel coupled to the third rotation element.

Advantageous Effects of Invention

When the engine is stopped while the vehicle is traveling, the first rotating element is braked. This restricts the rotational speed of the output shaft of the electric motor.

BRIEF DESCRIPTION OF DRAWINGS

FIG. 2 is a nomographic chart of a power split device.
FIG. 3 is a functional block diagram of an ECU.
FIG. 4 is a nomographic chart of the power split device when a carrier is braked.

DESCRIPTION OF EMBODIMENTS

An embodiment of the present invention will be described hereinafter, with reference to the drawings. In the following description, the same components are denoted by the same symbols. The names and functions thereof are also the same. Accordingly, detailed description thereof will not be repeated.

Figure 1:
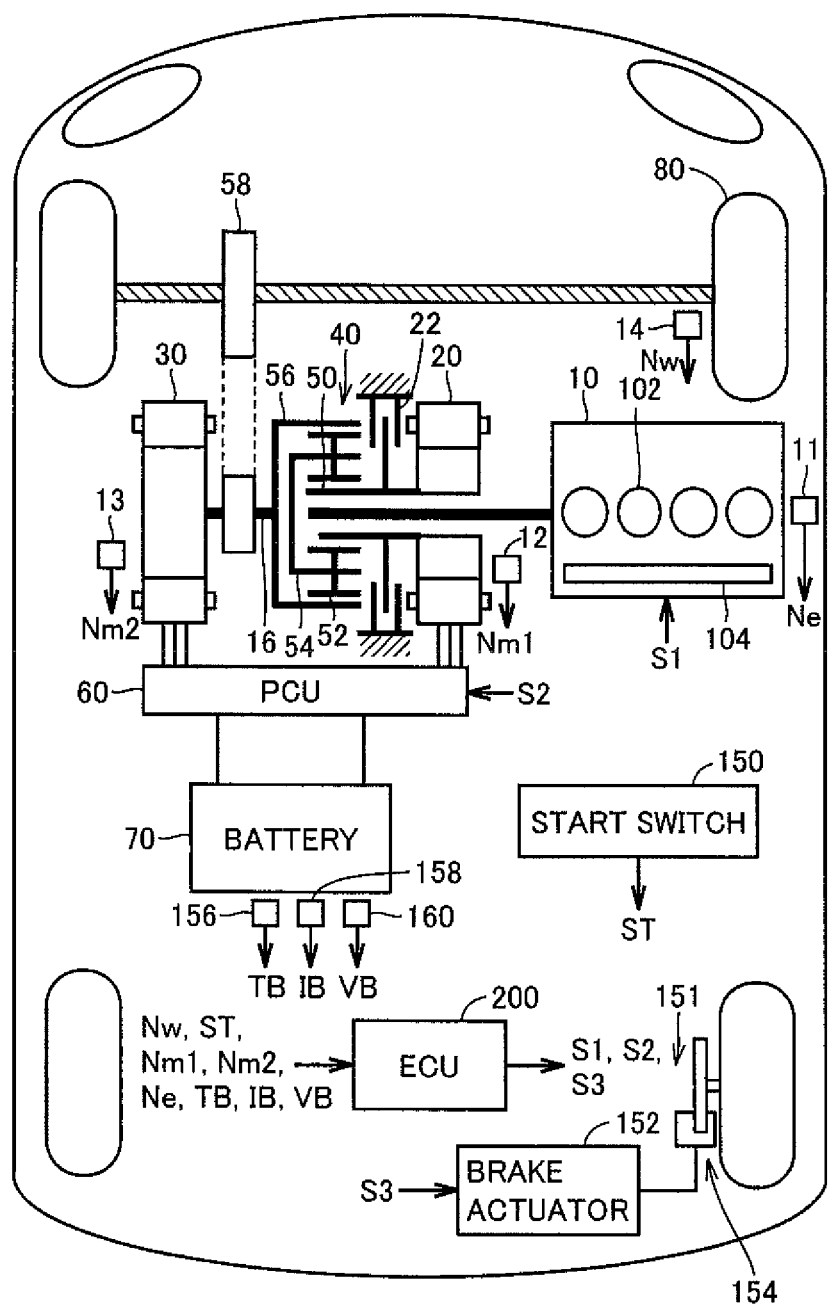
FIG. 1 is an overall block diagram of a vehicle.

Referring to FIG. 1, an overall block diagram of a vehicle 1 according to the present embodiment will be described. Vehicle 1 includes an engine 10, a drive shaft 16, a first motor generator (hereinafter referred to as first MG) 20, a second motor generator (hereinafter referred to as second MG) 30, a power split device 40, a speed reducer 58, a PCU (Power Control Unit) 60, a battery 70, drive wheels 80, a start switch 150, a braking device 151, and an ECU (Electronic Control Unit) 200.

Vehicle 1 travels with driving force output from at least one of engine 10 and second MG30. Motive power generated by engine 10 is split into two paths by power split device 40. Of the two paths, one is a path for transfer via speed reducer 58 to drive wheels 80, and the other is a path for transfer to first MG 20.

First MG 20 and second MG 30 are electric motors. First MG 20 and second MG 30 are, for example, three-phase AC rotating electric machines. First MG 20 and second MG 30 are driven by PCU 60.

First MG 20 has a function as a generator which generates electric power using the motive power of engine 10 split by power split device 40, to charge battery 70 via PCU 60. In addition, receiving electric power from battery 70, first MG 20 rotates a crankshaft of engine 10 which serves as an output shaft. First MG 20 thereby has a function as a starter which starts engine 10.

Second MG 30 has a function as a drive motor which provides driving force for drive wheels 80 using at least any one of the electric power stored in battery 70 and the electric power generated by first MG 20. In addition, second MG 30 has a function as a generator for charging battery 70 via PCU 60 with the use of electric power generated through regenerative braking.

Engine 10 is, for example, an internal combustion engine such as a gasoline engine and a diesel engine. Engine 10 includes a plurality of cylinders 102 and a fuel injection device 104 which supplies fuel to each of the plurality of cylinders 102. Based on a control signal S1 from ECU 200, fuel injection device 104 injects an appropriate amount of fuel for each cylinder with appropriate timing and stops injecting fuel for each cylinder.

For the detection of a rotational speed Ne of the crankshaft of engine 10 (hereinafter referred to as an engine rotational speed), engine 10 is further provided with an engine rotational speed sensor 11. Engine rotational speed sensor 11 transmits a signal indicating detected engine rotational speed Ne to ECU 200.

Power split device 40 is a differential gear that mechanically couples together three elements for rotating drive wheels 80: drive shaft 16, the output shaft of engine 10, and a rotation shaft (output shaft) of first MG 20. Power split device 40 utilizes any one of the above-indicated three elements as a reaction force element, thereby allowing for the transfer of motive power between the other two elements. A rotation shaft (output shaft) of second MG 30 is coupled to drive shaft 16.

Power split device 40 is a planetary gear mechanism including a sun gear 50, pinion gears 52, a carrier 54, and a ring gear 56. Pinion gear 52 engages with each of sun gear 50 and ring gear 56. Carrier 54 supports pinion gears 52 in a manner to allow them to rotate, and is coupled to the crankshaft of engine 10. Sun gear 50 is coupled to the rotation shaft of first MG 20. Ring gear 56 is coupled via drive shaft 16 to the rotation shaft of second MG 30 and speed reducer 58.

Sun gear 50 is braked by a brake 22. With brake 22, a rotational speed of sun gear 50 and a rotational speed of first MG20 can be maintained at zero.

Since engine 10, first MG 20, and second MG 30 are coupled together by power split device 40, rotational speed Nm1 of first MG 20, engine rotational speed Ne, and rotational speed Nm2 of second MG 30 vary in such a manner that rotational speeds Nm1, Ne, and Nm2 of these elements maintain such a relation that they are connected by a straight line in the monographic chart of FIG. 2.

Of three vertical axes of the nomographic chart shown in FIG. 2, the left vertical axis indicates the rotational speed of sun gear 50, that is, rotational speed Nm1 of first MG 20. The center vertical axis of the nomographic chart shown in FIG. 2 indicates the rotational speed of carrier 54, that is, engine rotational speed Ne. The right vertical axis of the nomographic chart shown in FIG. 2 indicates the rotational speed of ring gear 56, that is, rotational speed Nm2 of second MG 30. It is noted that the direction of an arrow formed by each vertical axis of the nomographic chart of FIG. 2 indicates a positive rotational direction, and a direction opposite to the direction of the arrow indicates a negative rotational direction.

For instance, as a solid line in FIG. 2 shows, it is assumed that, in vehicle 1, MG 20 rotational speed Nm1 is Nm1(0), engine rotational speed Ne is Ne(0), and second MG 30 rotational speed Nm2 is Nm2(0).

Power split device 40 rotates the rotational shaft of first MG 20 even when the vehicle is traveling and engine 10 is stopped. When the system of vehicle 1 is brought into a stop state while vehicle 1 is traveling at high speed, stopping fuel injection for engine 10 causes engine rotational speed Ne to decrease to zero. At this time, as a broken line in FIG. 2 shows, rotational speed Nm1 of first MG 20 increases in the negative rotational direction from Nm1(0) to Nm1(1). Therefore, as a vehicle speed increases, rotational speed Nm1 of first MG 20 when engine rotational speed Ne becomes zero (when rotation of engine 10 is stopped) may increase.

It is assumed that first MG 20 is used to start engine 10 when vehicle 1 is traveling and engine rotational speed Ne is zero. In this case, it is necessary to increase engine rotational speed Ne by moving rotational speed Nm1 of first MG 20 upward from Nm1(1) (the broken line in FIG. 2) to Nm1(0) (the solid line in FIG. 2).

Upon generation of torque in the positive rotational direction, which is opposite to the rotational direction of first MG 20 (the negative rotational direction), so as to increase the rotational speed of first MG 20 from Nm1(1) to Nm1(0), since first MG 20 is rotating in the negative rotational direction, first MG 20 generates electric power.

Such generation of electric power is unintentional. It is therefore preferable to restrict the generation of electric power at the time of start of engine 10. Thus, in the present embodiment, the rotational speed of first MG20 when engine 10 is stopped during traveling is restricted, as will be described below.

Referring back to FIG. 1, speed reducer 58 transfers motive power from power split device 40 and second MG 30 to drive wheels 80. In addition, speed reducer 58 transfers reaction force received by drive wheels 80 from a road surface, to power split device 40 and second MG 30.

PCU 60 converts DC power stored in battery 70 into AC power for driving first MG 20 and second MG 30. PCU 60 includes a converter and an inverter (both not shown) which are controlled based on a control signal S2 from ECU 200. The converter boosts a voltage of DC power received from battery 70 and outputs the boosted power to the inverter. The inverter converts the DC power output from the converter into AC power for output to first MG20 and/or second MG30. First MG20 and/or second MG30 are thus driven by using the electric power stored in battery 70. In addition, the inverter converts AC power generated by first MG 20 and/or second MG 30 into DC power and outputs it to the converter. The converter steps down a voltage of the DC power output by the inverter and outputs the stepped down power to battery 70. Battery 70 is thereby charged with the use of the electric power generated by first MG 20 and/or second MG 30. It is noted that the converter may be omitted.

Battery 70 is a power storage device and a rechargeable DC power supply. As battery 70, for example, a secondary battery such as a nickel-metal hydride secondary battery and a lithium ion secondary battery is used. Battery 70 has a voltage of the order of 200 V, for example. Battery 70 may be charged, other than with the use of the electric power generated by first MG 20 and/or second MG 30 as described above, with the use of electric power supplied from an external power supply (not shown). It is noted that battery 70 is not limited to a secondary battery, and may be anything that can generate a DC voltage, such as a capacitor, a solar cell, and a fuel cell, for example.

Battery 70 is provided with a battery temperature sensor 156 for detecting a battery temperature TB of battery 70, a current sensor 158 for detecting a current IB of battery 70, and a voltage sensor 160 for detecting a voltage VB of battery 70.

Battery temperature sensor 156 transmits a signal indicating battery temperature TB to ECU 200. Current sensor 158 transmits a signal indicating current IB to ECU 200. Voltage sensor 160 transmits a signal indicating voltage VB to ECU 200.

Start switch 150 is, for example, a push switch. Start switch 150 may be the one that allows a key to be inserted into a key cylinder and rotated to a predetermined position. Start switch 150 is connected to ECU 200. In response to operation of start switch 150 by a driver, start switch 150 transmits a signal ST to ECU 200.

ECU 200 determines that a start command is received when, for example, signal ST is received while the system of vehicle 1 is in the stop state, and then ECU 200 shifts the system of vehicle 1 from the stop state to a startup state. In addition, ECU 200 determines that a stop command is received when signal ST is received while the system of vehicle 1 is in the startup state, and then ECU 200 shifts the system of vehicle 1 from the startup state to the stop state. In the following description, operation of start switch 150 by the driver when the system of vehicle 1 is in the startup state will be referred to as an IG OFF operation, and operation of start switch 150 by the driver when the system of vehicle 1 is in the stop state will be referred to as an IG ON operation. Once the system of vehicle 1 shifts to the startup state, for example, a plurality of pieces of equipment necessary for vehicle 1 to travel are supplied with electric power, so that the system enters an operable state. In contrast, once the system of vehicle 1 shifts to the stop state, for example, part of the plurality of pieces of equipment necessary for vehicle 1 to travel are no longer supplied with electric power, so that the system enters an operation stop state.

A first resolver 12 detects rotational speed Nm1 of first MG 20. First resolver 12 transmits a signal indicating detected rotational speed Nm1 to ECU 200. A second resolver 13 detects rotational speed Nm2 of second MG 30. Second resolver 13 transmits a signal indicating detected rotational speed Nm2 to ECU 200.

A wheel speed sensor 14 detects a rotational speed Nw of drive wheel 80. Wheel speed sensor 14 transmits a signal indicating detected rotational speed Nw to ECU 200. ECU 200 calculates a vehicle speed V based on rotational speed Nw received. It is noted that ECU 200 may calculate vehicle speed V based on rotational speed Nm2 of second MG 30 instead of rotational speed Nw.

Braking device 151 includes a brake actuator 152 and a disk brake 154. Disk brake 154 includes a brake disk which rotates integrally with the wheel and a brake caliper which restricts rotation of the brake disk using hydraulic pressure. The brake caliper includes brake pads provided to sandwich the brake disk in a direction parallel to the axis of rotation, and a wheel cylinder for transferring hydraulic pressure to the brake pads. Based on a control signal S3 received from ECU 200, brake actuator 152 regulates hydraulic pressure to be supplied to the wheel cylinder by regulating hydraulic pressure which is created by depression of a brake pedal by the driver and hydraulic pressure which is created with the use of a pump and an electromagnetic valve and the like. Although FIG. 1 shows braking device 151 only at the right rear wheel, braking device 151 is provided for each wheel.

ECU 200 generates control signal S1 for controlling engine 10, and outputs generated control signal S1 to engine 10. Further, ECU 200 generates control signal S2 for controlling PCU 60, and outputs generated control signal S2 to PCU 60. Still further, ECU 200 generates control signal S3 for controlling brake actuator 152, and outputs generated control signal S3 to brake actuator 152.

By controlling engine 10, PCU 60, and the like, ECU 200 controls the entire hybrid system, that is, a state of charging/discharging of battery 70 and states of operation of engine 10, first MG 20, and second MG 30 such that vehicle 1 can travel most efficiently.

ECU 200 calculates requested driving force which corresponds to an amount of depression of an accelerator pedal (not shown) provided at a driver's seat. According to the calculated requested driving force, ECU 200 controls torques of first MG 20 and second MG 30 and an output of engine 10.

Vehicle 1 having a configuration as described above travels solely using second MG 30 when engine 10 is inefficient at the start of traveling or during low-speed traveling. In addition, during normal traveling, for example, power split device 40 divides the motive power of engine 10 into two paths of motive power. Motive power in one path directly drives drive wheels 80. Motive power in the other path drives first MG 20 to generate electric power. At this time, ECU 200 uses the generated electric power to drive second MG 30. In this way, by driving second MG30, assistance in driving drive wheels 80 is provided.

When vehicle 1 reduces its speed, regenerative braking is performed with second MG 30, which follows the rotation of drive wheels 80, functioning as a generator. Electric power recovered through regenerative braking is stored in battery 70. It is noted that when residual capacity (hereinafter referred to as the SOC (State of Charge)) of the power storage device has lowered and is in particular need of charging, ECU 200 increases the output of engine 10 to increase an amount of electric power generated by first MG 20. The SOC of battery 70 is thereby increased. In addition, even during low-speed traveling, ECU 200 may exert control for increasing the driving force from engine 10 as necessary, for example, such as when battery 70 is in need of charging as described above, when auxiliary machinery such as an air conditioner is to be driven, and when the temperature of cooling water for engine 10 is to be raised to a predetermined temperature.

In controlling amounts of charging and discharging of battery 70, ECU 200 sets, based on battery temperature TB and the current SOC, allowable input power in charging battery 70 (hereinafter referred to as a "charge power upper limit value Win") and allowable output power in discharging battery 70 (hereinafter referred to as a "discharge power upper limit value Wout"). For instance, as the current SOC gets lower, discharge power upper limit value Wout is gradually set lower. In contrast, as the current SOC gets higher, charge power upper limit value Win is gradually set lower.

In addition, the secondary battery used as battery 70 has temperature dependence that causes an increase in internal resistance at low temperatures. In addition, at high temperatures, it is necessary to prevent an over increase in temperature caused by further heat generation. It is therefore preferable to lower each of discharge power upper limit value Wout and charge power upper limit value Win when battery temperature TB is low and when battery temperature TB is high. ECU 200 sets charge power upper limit value Win and discharge power upper limit value Wout according to battery temperature TB and the current SOC, for example, through the use of a map or the like.

FIG. 3 shows a functional block diagram of ECU 200 mounted on vehicle 1 according to the present embodiment. ECU 200 includes a determination unit 202, a stopping unit 204, and a braking unit 206.

Determination unit 202 determines whether an IG OFF operation has been performed or not. Determination unit 202 determines that an IG OFF operation has been performed when, for example, signal ST is received from start switch 150 while the system of vehicle 1 is in a start state. It is noted that determination unit 202 may, for example, turn an IG OFF determination flag on when an IG OFF operation has been performed.

Further, determination unit 202 determines whether or not vehicle 1 is traveling. Determination unit 202 determines that vehicle 1 is traveling when vehicle speed V is higher than a predetermined vehicle speed V0. It is noted that determination unit 202 may turn a travel determination flag on when it is determined that vehicle 1 is traveling.

Stopping unit 204 stops engine 10 when it is determined that an IG OFF operation has been performed, that is, upon operation of start switch 150 by the driver. More specifically, fuel injection and ignition are stopped in order to stop engine 10. Even while the vehicle is traveling, engine 10 is stopped if an IG OFF operation is performed.

Braking unit 206 controls brake 22 to brake sun gear 50 when it is determined that an IG OFF operation has been performed while the vehicle is traveling, that is, upon operation of start switch 150 by the driver while the vehicle is traveling. Therefore, when engine 10 is stopped while the vehicle is traveling, brake 22 is controlled to brake sun gear 50. Brake 22 causes sun gear 50 to be stationary. Therefore, as shown in FIG. 4, the rotational speed of first MG 20 is maintained at zero or substantially zero. On the other hand, because the vehicle is traveling, the rotational speed of engine 10 does not become zero due to the rotation of ring gear 56, so that the output shaft of engine 10 is rotated. It is noted that the rotational speed of first MG 20 may not be zero.

Braking unit 206 controls brake 22 to brake sun gear 50 upon operation of start switch 150 in a state where the vehicle speed is higher than a threshold value V1. Thus, sun gear 50 is not braked even when start switch 150 is operated in a state where the vehicle speed is not higher than threshold value V1. Threshold value V1 is higher than predetermined vehicle speed V0 described above.

After sun gear 50 is braked with brake 22, when the vehicle speed has decreased to be not higher than threshold value V1, braking unit 206 controls brake 22 to stop braking. Alternatively, when a predetermined period of time has elapsed from when sun gear 50 is braked with brake 22, braking unit 206 controls brake 22 to stop braking. Alternatively, braking may be stopped when a prescribed period of time has elapsed from when start switch 150 has been operated, or when a prescribed period of time has elapsed from when engine 10 has been stopped (fuel injection has been stopped).

In the present embodiment, although determination unit 202, stopping unit 204, and braking unit 206 are described as realized through execution of a program stored in a memory by a CPU of ECU 200 and as functioning as software, they may be realized by hardware. It is noted that such a program is recorded in a storage medium for installation in the vehicle.

Figure 5:
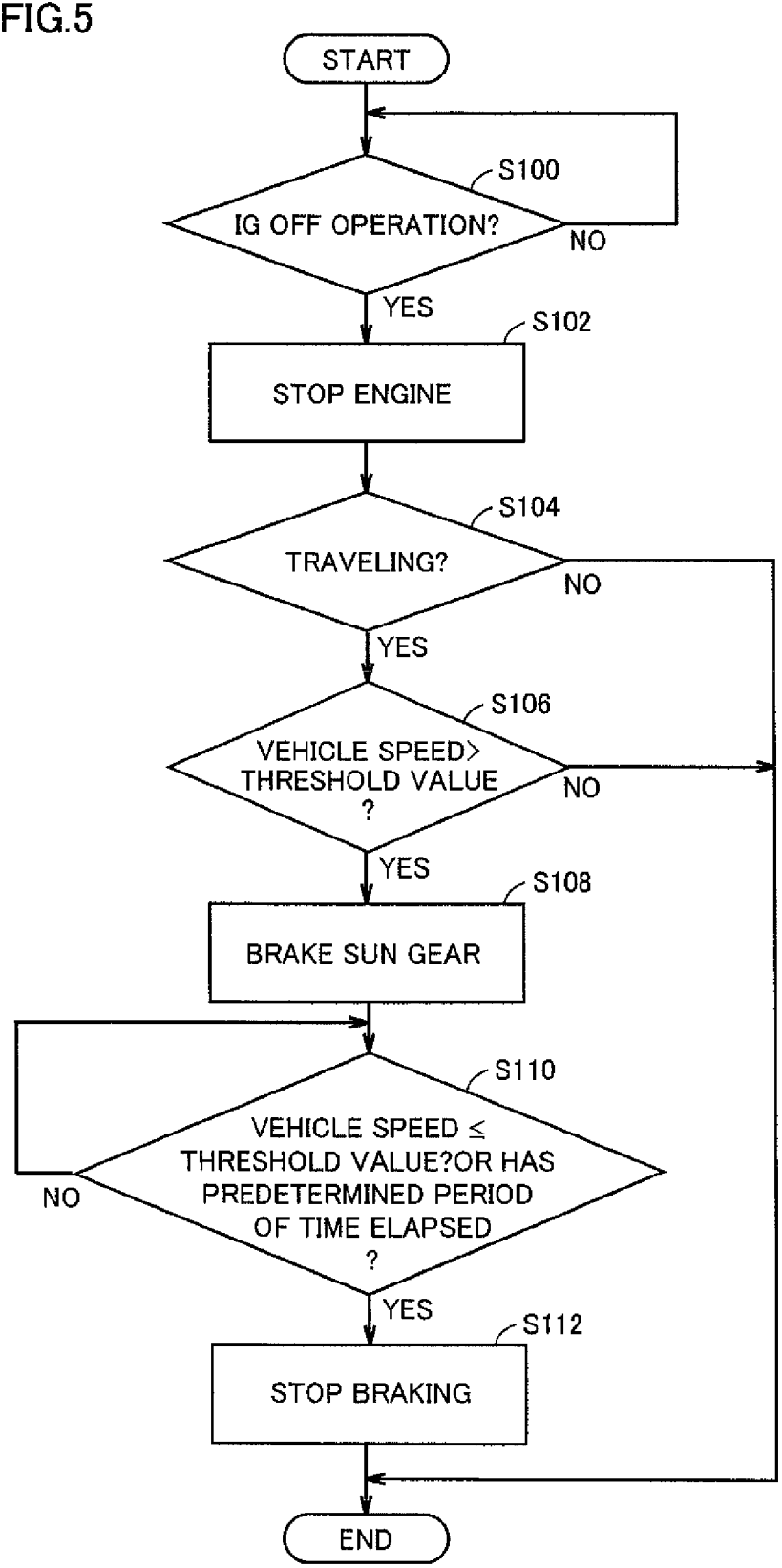
FIG. 5 is a flowchart of a process carried out by the ECU.

Referring to FIG. 5, a process to be carried out by ECU 200 mounted on vehicle 1 according to the present embodiment will be described.

In step ("step" will hereinafter be denoted as "S") 100, ECU 200 determines whether an IG OFF operation has been performed or not. If an IG OFF operation has been performed (YES in S100), ECU 200 stops engine 10 in S102. That is, fuel injection and ignition are stopped.

If vehicle 1 is traveling (YES in S104), ECU 200 determines in S106 whether the vehicle speed is higher than threshold value V1 or not. When the vehicle speed is higher than threshold value V1 (YES in S106), ECU 200 controls brake 22 to brake sun gear 50 in S108.

After sun gear 50 is braked with brake 22, if the vehicle speed has decreased to be not higher than threshold value V1, or if the prescribed period of time has elapsed (YES in S110), ECU 200 controls brake 22 to stop braking in S112. Brake 22 is thus released, causing sun gear 50 and first MG 20 to be rotatable.

As described above, according to the present embodiment, sun gear 50 is braked when engine 10 is stopped while the vehicle is traveling. This restricts the rotational speed of first MG 20.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1 vehicle; 10 engine; 11 engine rotational speed sensor; 12 first resolver; 13 second resolver; 14 wheel speed sensor; 16 drive shaft; 20 first MG; 22 brake; 30 second MG; 40 power split device; 50 sun gear; 52 pinion gear; 54 carrier; 56 ring gear; 58 speed reducer; 70 battery; 80 drive wheel; 102 cylinder; 104 fuel injection device; 150 start switch; 156 battery temperature sensor; 158 current sensor; 160 voltage sensor; 200 ECU; 202 determination unit; 204 stopping unit; 206 braking unit.

The invention claimed is:

1. A vehicle provided with a differential gear including a first rotation element, a second rotation element, and a third rotation element, a first motor generator coupled to said first rotation element, an engine coupled to said second rotation element, and each of a wheel and a second motor generator coupled to said third rotation element, comprising:
   a control unit that stops the engine upon operation of a switch by a driver; and
   a braking device that brakes said first rotation element upon operation of said switch while said vehicle is traveling.

2. The vehicle according to claim 1, wherein
   said braking device stops braking when a vehicle speed has decreased to be lower than a threshold value.

3. The vehicle according to claim 1, wherein
   said braking device stops braking when a predetermined period of time has elapsed.

4. The vehicle according to claim 1, wherein
   said braking device brakes said first rotation element upon operation of said switch in a state where a vehicle speed is higher than a threshold value.

5. The vehicle according to claim 1, wherein
   said first rotation element is a sun gear,
   said second rotation element is a carrier, and
   said third rotation element is a ring gear.

6. A control method for a vehicle provided with a differential gear including a first rotation element, a second rotation element, and a third rotation element, a first motor generator coupled to said first rotation element, an engine coupled to said second rotation element, and each of a wheel and a second motor generator coupled to said third rotation element, comprising the steps of:
   stopping the engine upon operation of a switch by a driver; and
   braking said first rotation element upon operation of said switch while said vehicle is traveling.

* * * * *